United States Patent
Bendix et al.

(10) Patent No.: US 6,484,810 B1
(45) Date of Patent: Nov. 26, 2002

(54) MECHANICAL HARVESTER FOR HARVESTING BULB CROPS

(76) Inventors: Richard D. Bendix, 630 Lilac La., Imperial, CA (US) 92251-8938; Orchel D. Krier, 630 Lilac La., Imperial, CA (US) 92251-8938

(*) Notice: Subject to any disclaimer, the term of this patent is extended or adjusted under 35 U.S.C. 154(b) by 0 days.

(21) Appl. No.: 09/878,501

(22) Filed: Jun. 11, 2001

(51) Int. Cl.[7] ............................................. A01D 27/00
(52) U.S. Cl. ......................... 171/31; 171/141; 171/11; 171/20; 171/62; 171/110; 56/327.1
(58) Field of Search ............................ 171/11, 13, 20, 171/23, 25, 28, 31, 40, 41, 42, 62, 110, 116, 126, 130, 141; 56/327.1; 99/636, 639

(56) References Cited

U.S. PATENT DOCUMENTS

| | | | |
|---|---|---|---|
| 2,331,520 A | | 10/1943 | Urschel |
| 3,613,796 A | * | 10/1971 | Cayton et al. |
| 4,236,581 A | * | 12/1980 | Beckett |
| 4,753,296 A | * | 6/1988 | Kruithoff |
| 5,207,277 A | * | 5/1993 | Medlock |
| 5,363,634 A | | 11/1994 | Saito |
| 5,376,046 A | | 12/1994 | Shuknecht |
| 5,431,000 A | | 7/1995 | Shuknecht |
| 5,454,460 A | | 10/1995 | Lane |
| 5,577,562 A | * | 11/1996 | Gresham |
| 5,694,754 A | | 12/1997 | Shuknecht |
| 5,750,171 A | | 5/1998 | Shuknecht |
| 6,033,305 A | * | 3/2000 | Perez et al. |
| 6,073,701 A | * | 6/2000 | Kleinemenke |

* cited by examiner

Primary Examiner—Victor Batson
(74) Attorney, Agent, or Firm—Richard A. Ryan

(57) ABSTRACT

A mechanical harvester for harvesting, topping and sacking bulb crops, such as onions. The harvester extracts the onions from the ground and transports them rearward to a cutting assembly by conveyor systems that drop out small onions, dirt, rocks and debris. The cutting assembly comprises a set of elongated cutting blades positioned to cooperatively accept and sever the leaves and roots from the bulb. The offal drops away from the harvester to the ground by manner of gravity. After cutting, the onions are transported through an inspection assembly for inspection, sorting, grading and further distribution. The onions are then transported rearward to a sacking assembly for placing the onions into sacks, to a chute device returning the onions to the ground or to a conveyor system transferring the onions to an adjacent vehicle. Platforms on the sides and ends of the harvester facilitate the above operations.

28 Claims, 10 Drawing Sheets

MECHANICAL HARVESTER FOR HARVESTING BULB CROPS

BACKGROUND OF THE INVENTION

1. Field of the Invention

The field of the present invention relates generally to mechanical harvesters for use in harvesting crops. More specifically, the present invention relates to such harvesters that may be moved along the ground and which are particularly suitable for harvesting bulb crops such as onions, beets, radishes, turnips, garlic and the like. Even more specifically, the present invention relates to such mechanical harvesters that are able to separate the useful crop from its associated plant material, such as roots and tops, and place the processed crop into bags or sacks.

2. Background

As is well known, the harvesting of bulb crops such as onions, beets, radishes, turnips, garlic and the like (also collectively referred to herein as "onions") present particular problems that make harvesting of such crops more difficult and expensive than many other types of crops. Typically, the useful bulb portion of these crops grow in the soil with roots growing down from the useful portion and top plant material growing upward above the soil. To harvest the crops, the entire plant must first be extracted from the ground and then the roots and tops must be cut off. Harvesting these crops by hand is a very expensive, labor intensive process requiring a significant number of laborers to extract the crops and then separate the bulb from the roots and tops. As a result, mechanical harvesters for harvesting these crops have been in use for a number of years. Unfortunately, many of the mechanical harvesters have had problems with nicking, cutting or bruising of the bulb or failing to cut-off the roots and tops in the proper location relative to the bulb (in those machines which are even configured to cut-off both roots and tops).

In regards to the previous onion field harvesting machines that are configured to extract onions and remove the tops and roots therefrom, U.S. Pat. No. 4,373,589 to Hagiz on Feb. 15, 1983, U.S. Pat. No. 4,753,296 to Kruithoff on Jun. 28, 1988, U.S. Pat. No. 5,197,549 to Shuff on Mar. 30, 1993, and U.S. Pat. No. 5,363,634 to Saito on Nov. 15, 1994, and others disclose various methods of air flow generation and direction to orient the onion tops and roots in a manner such that they may be severed from the onion bulb. In the inventions listed above the onions are removed from the soil by a conveyor apparatus and then positioned by various means of air flow generation and direction so as to direct the tops and roots into severing devices that shear or cut the onion appendages by mechanisms having rotating or reciprocating blades. These prior mechanical harvesters have achieved some degree of success. However, because onions do not grow uniformly and typically vary in size, shape and bulb diameter, mechanical harvesters that utilize air flow generators to orientate the bulb for cutting generally are only partially effective at cutting tops and roots at uniform lengths. Often the onions harvested by these machines require the onions to be topped by use of an additional device prior to the harvesting operation, require the tops of the onions be significantly dried out prior to harvest, or require additional manual trimming and clipping prior to the curing and/or grading processes.

Other bulb or root crop harvesting machines use gathering mounts and lifting frame assemblies to convey the crops by their leafy appendages to various cutting devices that separate the leafy materials and the roots from the useful crop. U.S. Pat. No. 4,173,257 to Mortensen and Browning on Nov. 6, 1979, as well as many earlier patents, disclose such root crop harvesters of this nature. These devices rely on the lifter assemblies to convey the vegetables up through the severing devices in order to accomplish the leafy material separation. The patent to Spiegel, U.S. Pat. No. 2,368,895 dated Feb. 6, 1945, discloses a carrot and onion harvester. As is typical with the Mortensen and Browning root crop harvester the topping bar assemblies are well known in the art and are widely described as to form and function. Although the topping bar assemblies are very successful at removing the tops by a crimping or pinching action, these, devices typically result in a less than clean severed cut at the ends of the leaves and the top of the root crop. Such cuts are typically less desirable or not acceptable for fresh market onions due to the unfinished appearance of the onion bulb.

U.S. Pat. No. 4,373,589 to Hagiz on Feb. 15, 1983, U.S. U.S. Pat. No. 3,597,909 to Lauridsen on Aug. 10, 1971, and others disclose machines for harvesting onions and the like having various lifting and cutting mechanisms that also utilize bagging or sacking devices for placing the finished product directly in the bag or sack for market. These bagging or sacking devices typically employ delivery devices consisting of upright chutes or collection bins that collect topped onions for later placement into sacks or bags. By design, these chutes and bins are used to direct the onions. As a result, they provide numerous opportunities for damage to occur to the onion from onion to onion and onion to machine contact. Mechanical damage or excessive bruising is not acceptable for fresh market onions and can be a market or cosmetic defect that lowers the price and reduces the marketability of the onions, thereby causing economic loss to either or both the harvester and grower. In addition, the mechanical damage is often a pathway for pathogens to enter the bulb of the onion.

It can be appreciated, therefore, that what is needed is a mechanical harvester for harvesting bulb crops, particularly onions, that effectively and efficiently harvests the onions from the field and provides for improved culling and cutting of the onions, particularly the removal of the tops and roots. The desirable harvester would reduce the amount time and labor necessary to harvest onions and be suitable for harvesting onions when the tops are still green (requiring less field drying time). To accomplish this, the desired harvester should not rely on blown air to orientate the onion for cutting.

SUMMARY OF THE INVENTION

The mechanical harvester for harvesting onions of the present invention solves the problems and provides the benefits identified above. That is to say, the present invention provides a harvester for harvesting onions that results in improved extraction of the onions from the field, improved removal of the unwanted root and top portions from the onion and placement of the cut onions in bags or sacks, while substantially reducing the amount of time and labor necessary to harvest the onions.

In the primary embodiment of the present invention, the harvester of the present invention primarily comprises a harvester frame, comprised of a plurality of frame members, having a top portion and a pair of opposing sides. The harvester is suitable for being towed behind a tractor or other apparatus or for being modified to be self-propelled. At the front end of the harvester is a crop extracting mechanism comprising a lifting bar for extracting the onions from the field and flapper wheel for coaxing the onions into a one or more conveyor assemblies. In the preferred embodiment, the flapper wheel first assists in the placement of onions on a lifting conveyor assembly and then on an inclined elevator assembly, each of which has a conveyor system that allows small, unmarketable onions and any debris to fall through the conveyor onto the ground below the harvester. The lifting conveyor assembly is hydraulically connected to the frame so that the operator of the unit can raise or lower the lifting assembly so as to transport the harvester between fields and/or to place the lifting bar on the upper portion of the soil when harvesting. The conveyor systems deliver the onion plants to a cutting assembly which removes the roots and tops from the onion bulb. After cutting, the onions are transported rearward to an inspection assembly for final culling of unmarketable onions and debris and then to a sacking assembly where the onion bulbs are placed in burlap or like sacks.

The cutting assembly of the preferred embodiment of the present invention comprises a plurality of roller bar cutters connected at opposing ends to an upper bearing block assembly and a lower bearing block assembly. A hydraulic motor powers the cutting assembly to rotate the roller bar cutters. In the preferred embodiment, the roller bar cutters are grouped in sets, each set having at least a pair of roller bar cutters that rotate in opposite directions to each other. Preferably, the roller bar cutters rotate in a generally flat elliptical path to provide a more even upper compound surface to minimize the surface damage to the onions. The roller bars have a leading edge which is shaped and configured to a sharp angle to further facilitate cutting the onions without harming the onions. The cutting assembly of the preferred embodiment also includes a topping length limiting device that extends the entire length of the roller bar cutters to limit how short the top leafage is cut relative to the top of the onion. Channeling and deflecting devices are utilized to funnel the onions to the optimum location for cutting and to deflect the cut waste materials away from the harvester and the onions to the rear of the harvester for inspection and sacking.

To further facilitate the inspection, culling of onion plants and debris and sacking operations, the harvester has one or more platforms attached to the sides or back end for workers to stand on while the harvester is pulled or driven through the field. In the preferred embodiment, the harvester has three sets of platforms, two along both sides and one along the back end. The side platforms are utilized for removing debris and inspecting the cut onions and for assisting the cutting of the onions. The rear platform is utilized for the sacking operation. For ease of use, the rear platform can raise or lower by use of a hydraulic ram assembly.

Accordingly, the primary objective of the present invention is to provide a mechanical harvester for harvesting onions having the features generally described above and more specifically described below in the detailed description.

It is also an important objective of the present invention to provide a mechanical harvester that effectively and efficiently harvests onions from the field, cuts the tops and roots off of the onions and places the onions into bags or sacks.

It is also an important objective of the present invention to provide a mechanical harvester that extracts onions from the field, cuts the roots and tops off the onions, provides for culling and inspection of the onions and has the ability to place the cut onions in a sack.

It is also an important objective of the present invention to provide a mechanical harvester where the length of the residual top of the onion is controlled in reference to the shoulder of each bulb, where the length of residual top is the same for each bulb, and where the tops may be trimmed to a desirably short length without damaging the bulbs.

Yet another important objective of the present invention is to provide a mechanical harvester that utilizes a plurality of roller bar cutters that rotate in a generally elliptical path so as to cut the tops off of onions without damaging the onions.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
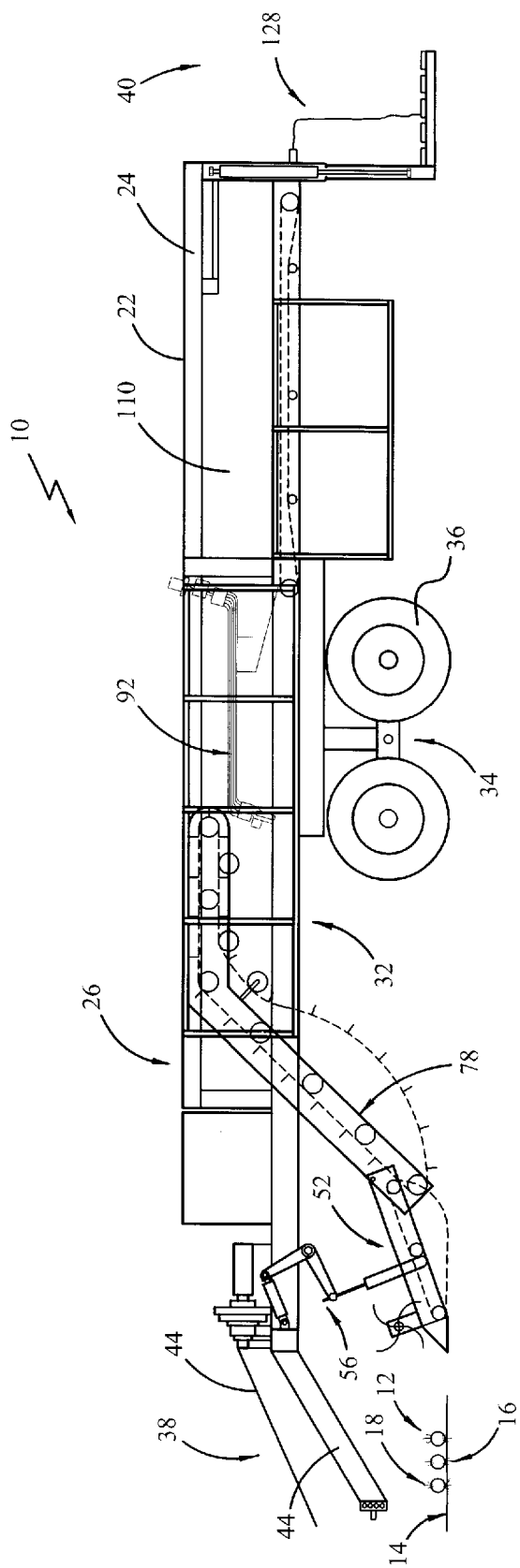
FIG. 1 is a first side elevation view of the harvesting apparatus of the present invention.
Figure 10:
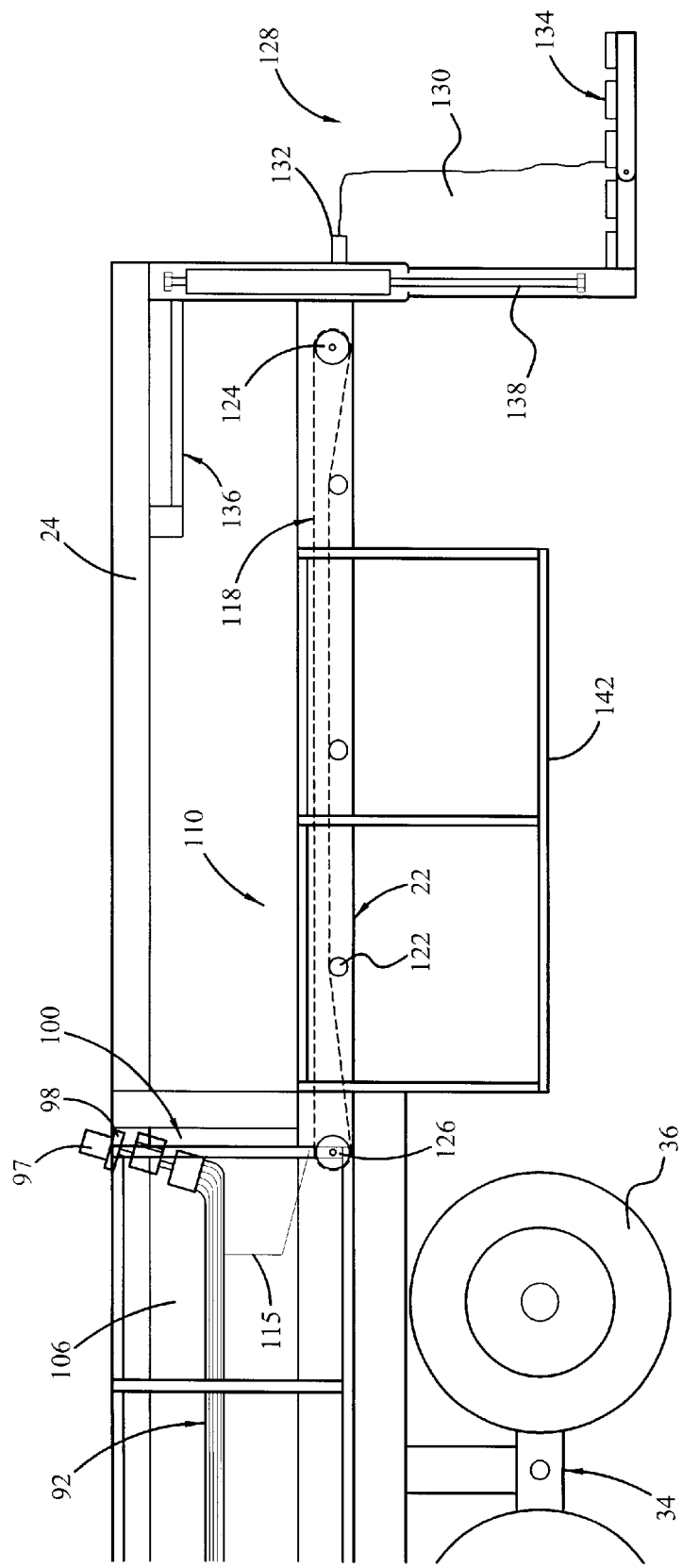
FIG. 10 is a first side elevation view of the rear portion of the harvesting apparatus of the present invention.

With reference to the figures where like elements have been given like numerical designations to facilitate the reader's understanding of the present invention, and particularly with reference to the embodiment of the present invention illustrated in the referenced figures, the preferred embodiments of the present invention is set forth below. As shown in FIG. 1, the mechanical harvester, designated generally as 10, for use in harvesting one or more beds of bulb crops, such as onions 12, grown in an agricultural field 14 is configured to extract the onions 12 from field 14 and prepare the onions 12 for sale by removing the roots 16 and tops 18 from the bulbs 20 and placing the prepared onions 20 in a bag or sack 130 (best shown in FIG. 10) for market. Although the present discussion primarily refers to the harvesting of onions utilizing harvester 10 of the present invention, the invention is not so limited. In fact, harvester 10 is also useful for the harvesting of a number of other bulb crops including, but not limited to, turnips, beets, garlic, radishes and like crops that require extraction from the field 14 and removal of roots 16 and/or tops 18 from the bulb crop 20. The mechanical harvester 10 constructed and operative in accordance with an embodiment of the present invention is designed to harvest, allow for inspection, and sack the harvested onions 12 while harvester 10 is in motion.

Figure 2:
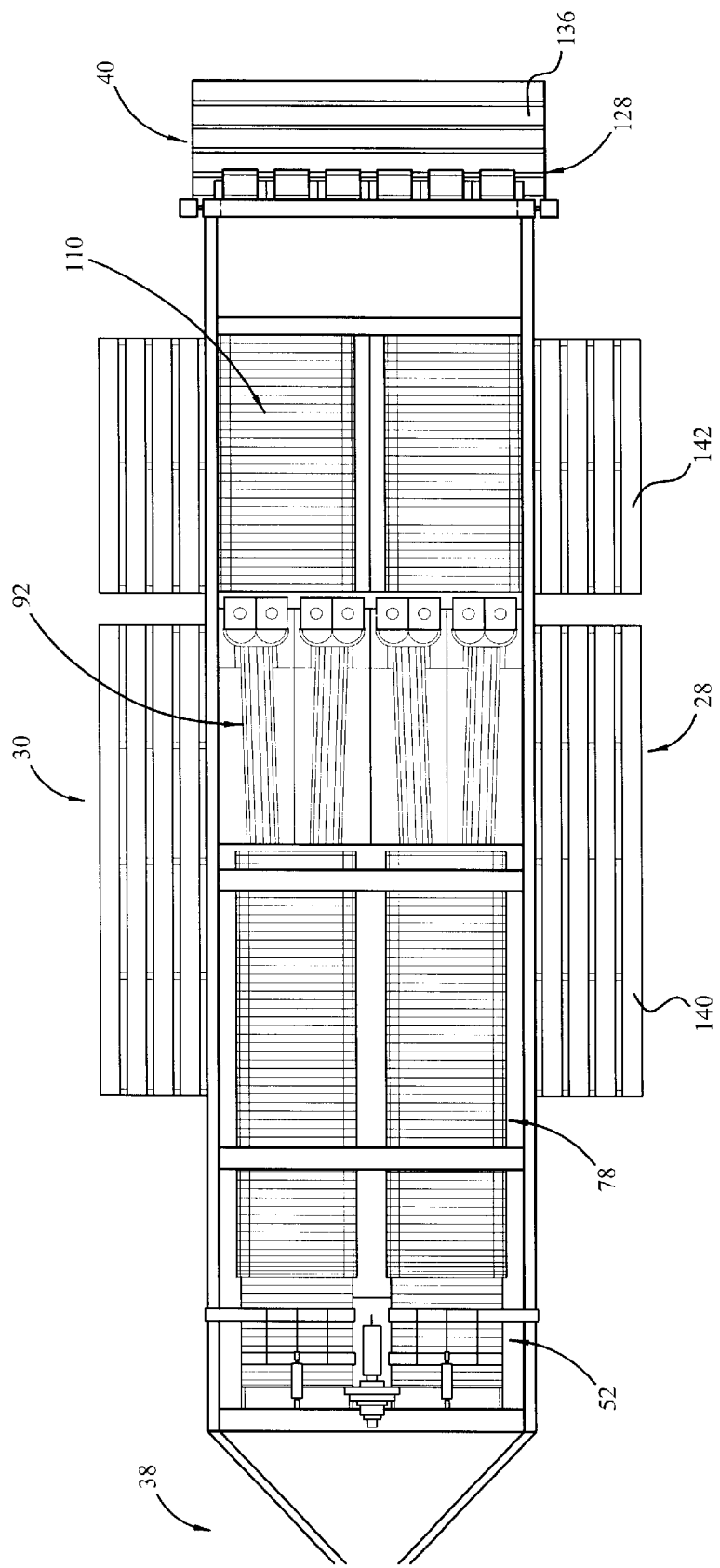
FIG. 2 is a top plan view of the harvesting apparatus of the present invention.

The preferred embodiment of the mechanical harvester 10 of the present invention, shown in its entirety in FIGS. 1 and 2, comprises harvester frame 22 made up of a plurality of frame members 24 configured together to form a top portion 26, first side 28 and opposing second side 30. On the lower portion 32 of frame 22 is an axle assembly 34 having one or more wheels 36 rotatably attached thereto to facilitate movement of harvester 10 across the ground, including field 14. Preferably, axle assembly 34 is positioned generally in the middle of frame 22 between front end 38 and back end 40 of harvester 10. However, axle assembly 34 can be positioned under frame 22 as necessary to assist with balance of harvester 10. In addition, harvester 10 can comprise one or more axle assemblies 34 under frame 22, as desired, and/or the axle assembly 34 can be moveable or rotatable, as is known in the art, to provide for the extension and contraction or rotation of the vehicle's wheel base to allow for a smaller turning radius when operating in field 14.

The mechanical harvester 10 of the present invention can be configured to harvest one or more beds of onions 12 at the same time, with each onion bed having multiple rows of onions. In the embodiment shown in the referenced figures, the harvester 10 is configured to harvest two beds of onions 12 at the same time. As is more fully set forth in the text below, the components and set-up of harvester 10 is a mirror image as taken down the longitudinal axis of the harvester 10 (as best illustrated by FIG. 2). Although the text set forth herein refers to the two-bed harvester 10, the present invention is not so limited. In fact, harvester 10 may be made with the capability to harvest one or more beds at the same time. The limiting factor for the number of beds which can be harvested at the same time may be the maximum width allowed for vehicles to safely travel the roads between fields. In addition, with more than two beds being harvested at the same, time, inspection of the moving onions 12 by field workers as the onions 12 are harvested would likely be more difficult.

As shown in FIGS. 1 and 2, the harvester 10 of the present invention can be configured to be towed behind a tractor, as is typical, or other field-use vehicles (not shown) to harvest the onions 12 from field 14. In this configuration, harvester 10 connects to the tractor by tongue 42 and power take-off shaft 44. Power take-off shaft 44 is connected to a support bearing 46, an RPM step-up device 48 and hydraulic pump 50 on harvester 10. The RPM step-up device 48, such as a planetary gear increaser, increases the RPM of the power take-off shaft 44 (i.e., from 1000 to 2000 RPM) for use to operate pump 50, which could be a gear pump or a piston pump or equivalent pumps. In the configuration shown in the attached figures, the engine/motor of the tractor drives hydraulic pump 50, which is in fluid communication with the various hydraulically driven devices on harvester 10, as described in more detail below. Although the tongue 42 is shown as being connected to the front end 38 of harvester 10, those skilled in the art will recognize that tongue 42 and power take-off shaft 44 can connect at axle assembly 34 or elsewhere on harvester 10. In fact, connecting to the axle assembly 34 may be preferred to relocated pump 50 and eliminate excessive operating angles of the PTO shaft 44.

Alternatively, the harvester 10 can be configured to include a self-contained motor to drive pump 50 so as to eliminate the need to take power from the tractor and, as a result, PTO shaft 44. As an alternative to being configured as a towed-behind harvester, harvester 10 can be a self-propelled vehicle that includes accommodations for an operator to control the movement of the harvester 10 in the field 14 and on the highways and roads between fields 14. For such a configuration, a motor (not shown), such as a diesel engine, can be used to provide the power to move harvester 10. As known to those skilled in the art, a variety of power sources can be efficiently and effectively utilized for the motor. Any motor should be sized and configured to be able to move harvester 10 through a field under a variety of ground conditions, including dirt or muddy fields, and to drive pump 50. The tongue 42 and PTO shaft 44 would not be needed for the self-propelled configuration.

Figure 3:
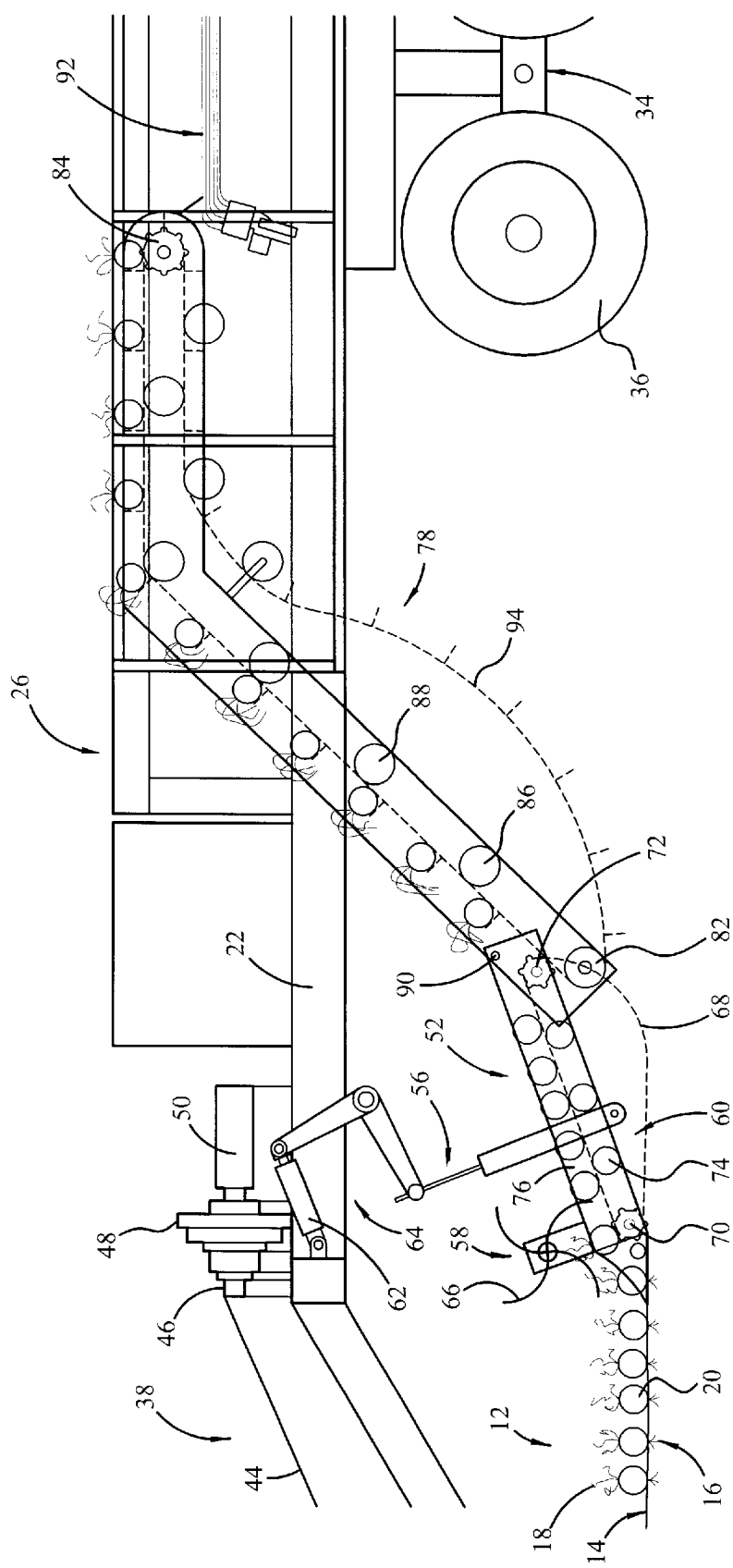
FIG. 3 is a first side elevation view of the front portion of the harvesting apparatus of the present invention.

Harvester 10 has a lifting assembly 52 to extract onion plants 12 from field 14 and initiate the harvesting process. Lifting assembly 52 comprises a rotating lifting bar 54, lifting adjustment mechanism 56, flapper assembly 58 and lifting conveyor assembly 60, as best shown in FIGS. 1 and 3. Lifting bar 54 is sized and configured to extract onion plants 12 along one or more beds in field 14 by rotating slightly below the crop, breaking up the soil to loosen and uproot the onions 12. As is known in the art, lifting bar 54 can be a rotating one inch square bar that undercuts, shakes and promotes lifting of onions 12 onto the lifting conveyor assembly 60. To allow harvester 10 to be towed or driven over areas not having onions 12, such as roads and between beds, lifting adjustment mechanism 56 raises and lowers lifting assembly 52, and consequently lifting conveyor assembly 60, as is needed to safely pass over non-harvesting areas (i.e., typically twelve to eighteen inches) and to properly place lifting bar 54 under the onions 12. Lifting assembly 52 has a hydraulic ram 62 driven by pump 50 and a linkage assembly 64 having one or more pivot connections interconnecting lifting conveyor assembly 60 and frame 22. As is known in the art, lifting adjustment mechanism 56 can be configured in a number of different ways to accomplish its objective of raising and lowering lifting conveyor assembly 60.

Flapper assembly 58, comprising a hydraulically powered flapper wheel 66, collects the onion plants 12 from lifting bar 54 and coaxes them onto lifting conveyor assembly 60. Flapper wheel 66 is preferably made out of rubber or flexible rubber-like material, to avoid damaging onion plants 12 as they are extracted from field 14, that extends the width of lifting conveyor assembly 60. As flapper wheel 66 rotates around its central axle, the paddle-like members push the onion plants 12 rearward toward the lifting conveyor assembly 60. In the preferred embodiment, lifting conveyor assembly 60 is comprised of a hydraulically-driven lifting conveyor 68, first lifting sprocket 70, second lifting sprocket 72, rollers 74, hydraulic motor (not shown) in fluid connection with pump 50, and protective sidewalls 76. Lifting conveyor 68 interconnects first lifting sprocket 70, which can be a cone-shaped roller, and second lifting sprocket 72, and is operatively supported by rollers 74. In the preferred embodiment, lifting conveyor 68 is a hook chain type of conveyor (such as those available from Acme Manufacturing Company out of Filer, Id.). Although other types of conveyors could be suitable for lifting conveyor 68, most such conveyors may not be able to withstand any contact with the ground and could be easily damaged. In the preferred embodiment, one out of every fifth or sixth bar is raised to support the onions 12 as they are transported up lifting conveyor 68. The use of raised bars is preferred over standard flights due to the tendency of such flights to break off as they hit the ground when used with the lifting conveyor 68. The pitch of the hook chain lifting conveyor 68 should be sized so as to retain properly sized onions 12, but be able to drop out small rocks or other debris (i.e., an opening of 1½" to 1⅞"). The lifting conveyor assembly 60 is driven by hydraulic motor (not shown) at second sprocket 72. Sidewalls 76 prevent onions 12 from falling off the side of lifting conveyor 68 so as to facilitate conveying onion plants 12 rearward and upward to the inclined elevator assembly 78.

Inclined elevator assembly 78 is comprised of an inclined conveyor 80, first elevator roller 82, elevator sprocket 84, a plurality of rollers 86, sidewalls 88 and hydraulic motor (not shown). The rearward end of the lifting assembly 52 pivotally connects to the front end of the fixed inclined elevator assembly 78 by connecting pins 90 through the overlapping lifting assembly sidewalls 76 and inclined elevator assembly sidewalls 88 so that the adjustable lifting assembly 52 may be raised or lowered by lifting adjustment mechanism 56. In the preferred embodiment, inclined conveyor 80 is of the belted bar-chain type (such as those available from Acme Manufacturing Company) that are suitable for interconnecting first elevator roller 82 and second elevator sprocket 84, and convey onions 12 from the lifting assembly 52 to the cutting assembly 92 (described in detail below). As is known in the art, belted bar-chain conveyors 80 comprises a plurality of spaced apart bars linked together by two parallel belts. The spacing between the bars, referred to as the pitch, should be such that the conveyor 80 will retain onions 12 of saleable size, based on the diameter of the onion bulb 20, yet sufficient to allow small, undersized onions 12, stones, soil and other unwanted debris (i.e., some of which has potential to damage cutting assembly 92) to fall through the belted bar-chain conveyor 80 on to the ground below harvester 10. In the preferred embodiment, inclined conveyor 80 includes a plurality of flights 94 thereon to assist in holding onions 12 on inclined conveyor 80 as they are conveyed rearward and upward. Inclined conveyor 80 is supported by rollers 86 and driven by the hydraulic motor (not shown), which is in fluid communication with hydraulic pump 50. Sidewalls 88 prevent onions 12 from falling off the side of the inclined elevator assembly 78 so as to facilitate conveying onions 12 rearward and upward (as best shown in FIG. 3) to the cutting assembly 92.

Figure 4:
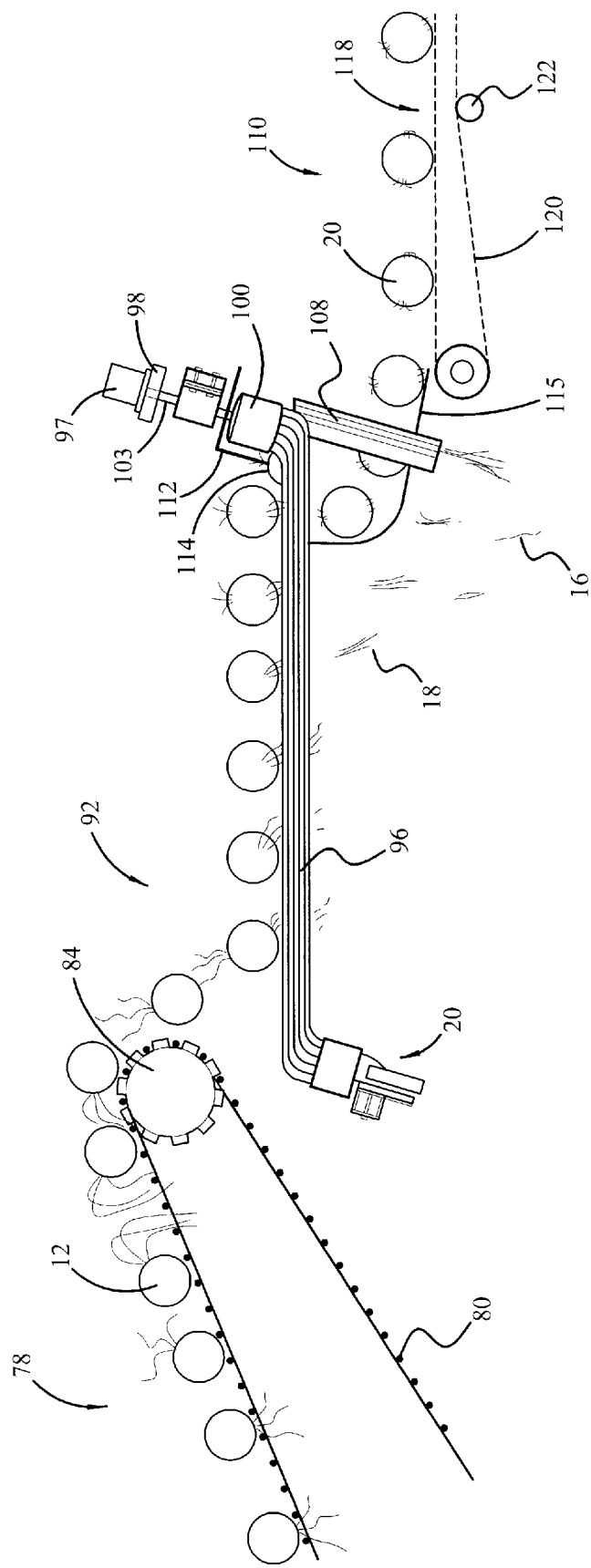
FIG. 4 is a first side elevation view of the cutting assembly area of the harvesting apparatus of the present invention.
Figure 5:
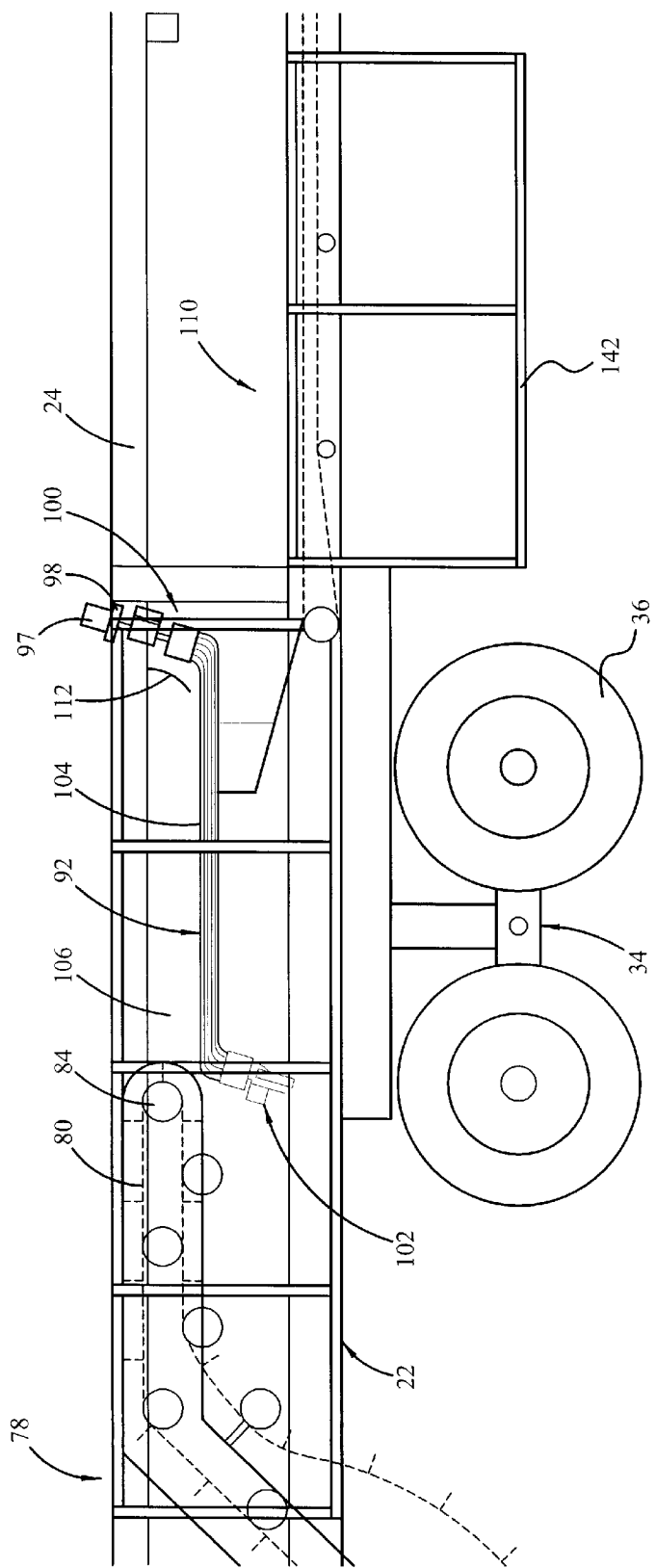
FIG. 5 is a first side elevation view of the middle portion of the harvesting apparatus of the present invention.
Figure 6:
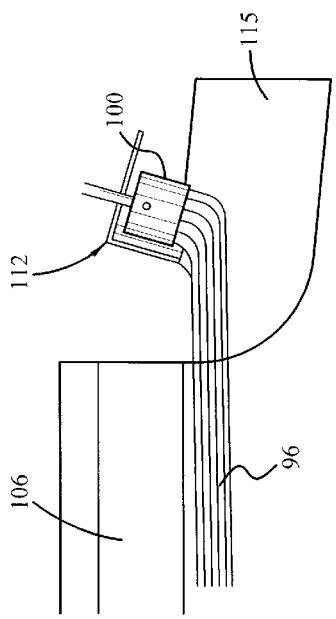
FIG. 6 is a side cross-sectional view of one-half of a set of the roller bar cutting assembly for use with the present invention.
Figure 7:
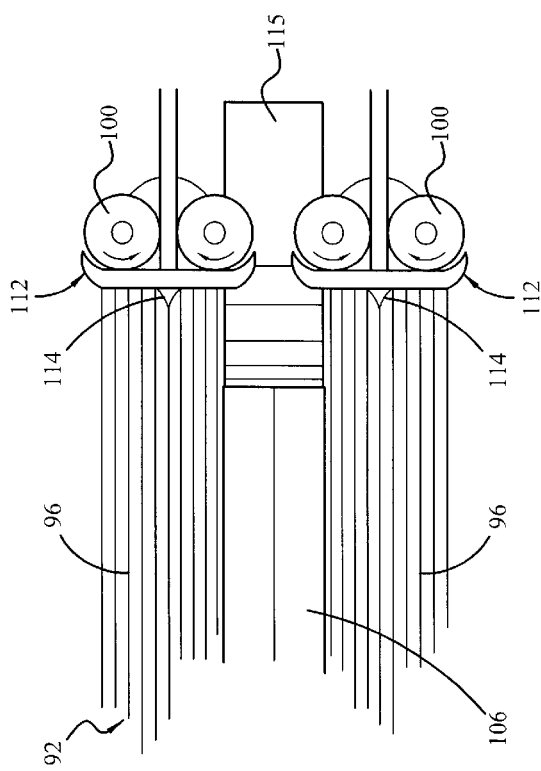
FIG. 7 is a top plan view of two adjacent sets of the roller bar cutting assembly for use with the present invention.
Figure 8:
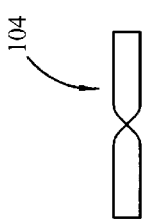
FIG. 8 is a cross sectional view of the opposing bars of the cutting bar mechanism for use with the present invention.
Figure 11:
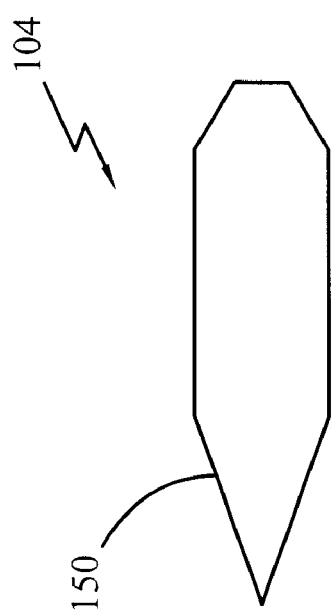
FIG. 11 is a cross-sectional view of a preferred roller bar cutter for use in the harvester of the present invention.

Cutting assembly 92, shown best in FIGS. 2 and 4, comprises a plurality of roller bar cutters 96 that are rotatably driven by hydraulic motor 97 and its associated gearing 98. Roller bar cutters 96 are rotatably connected to upper bearing block assembly 100 at the driving end and lower bearing block assembly 102 at the driven end. The roller bar cutters 96 should be long enough to allow onion crops 12 to have sufficient time to be placed in position to have the roots 16 and tops 18 severed by roller bar cutters 96. The inventor has found that a length of 48' to 60' is typically sufficient. The lower bearing block assembly 102 includes a yoke housing assembly that allows limited swing about the vertical axis of the bearing shaft and limited forward and aft motion along the axis of the roller bar cutters 96. As best shown in FIG. 7, which is a top view of adjacent sets of roller bar cutters 96, each set of roller bar cutters 96 comprise a pair of counter-rotating (as illustrated by the arrows) roller bar cutters 96 such that the onion 12 is centered over the set of roller bar cutters 96 so the roots 16 and tops may be severed by the roller bar cutters 96 during the cutting process. FIG. 8 illustrates the end view of two opposing bars 104 of the roller bar cutters 96 and the general relationship between them. Also generally shown in FIG. 11 is the profile, and general configuration of the inner and uppermost corner of the cutting bars 104 and the greater width of the bars 104 that reduces the abrupt contact of the corner with the onion bulb 20 and provides a relatively horizontal plane for the cutting of the tops 18 and roots 16 to take place. Each set of roller bar cutters 96 is separated from the other sets of roller bar cutters 96 by a channeling device 106 (best shown in FIG. 7) that directs the onion 12 toward the center of the set of roller bar cutters 96.

Each of the bars 104 of roller bar cutters 96 should be shaped and configured to effectively and efficiently cut the roots 16 and tops 18 off the onion crop 12. As shown in FIG. 11, the leading (cutting) edge 150 of the cutter bars 104 should be angled to so as to cut the tops 18 off of onion bulb 20 without cutting bulb 20 and be able to leave the desired amount of residual top on the bulb 20, as desired for marketing purposes. As explained below, topping length limiting device 116 is necessary to accomplish this objective. The inventor has found that roller bar 104 approximately 2" wide by ½" height having a leading edge 150 angle of approximately 20 to 25 degrees works well with the harvester of the present invention. In addition to configuring the cutter bars 104, the inventor has found it necessary to modify the ends of the cutter bars 104 so that the rotating path of the roller bar cutters 96 is more of a flat elliptical path, as opposed to the more circular paths of the prior art devices, so as to provide for a more even surface for cutting the onions 12. These modifications include cutting or shortening the component that connects the end of the cutter bars 104 to the upper bearing block 100. In addition, the angle of the shaft 103 connecting the hydraulic motor 97 and gearing 98 with the upper bearing block 100 needs to be increased in order to decrease the amount of vertical travel of bars 104 as they make the flat elliptical path. This reduces the distance from the center of the pin that is attached to the bearing block 100 to the leading edge 150 of the cutting bar 104, thereby reducing the "standoff". The modifications also reduce the width of the elliptical path to further provide a more even surface for the onions 12 to be exposed. The prior art configurations have a much greater difference between the uppermost and lowermost positions of the roller bars 104 as they travel in their circular or elliptical path. Because the angle is significantly greater in the present invention 10, there is a less overall difference in height, providing the more even and flatter moving surface for the onions 12 to come in contact with.

In addition, because the cutter bars 104 do not travel to as high a position in its elliptical orbit or path, it does not strike the onion with as much vertical force. The effect of these modifications is to significantly reduce the mechanical damage to the outer surface of the onion bulb 20.

Figure 9:
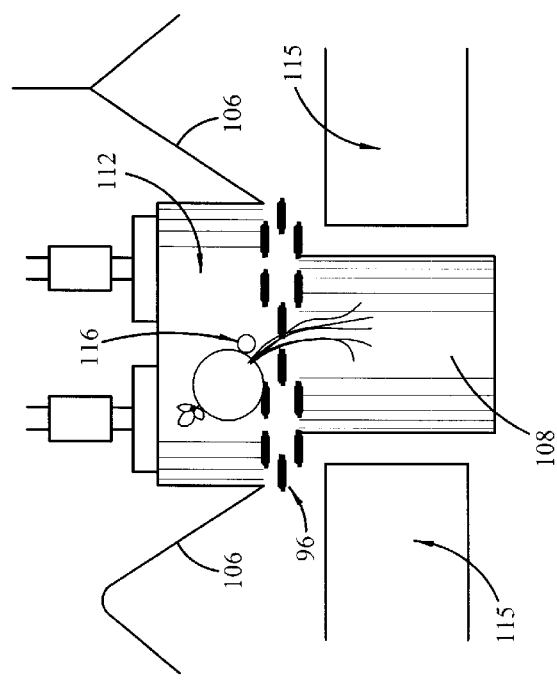
FIG. 9 is a cross sectional view of one of the cutting bar mechanisms with distribution apparatus of the present invention.

Cutting assembly 92 also comprises a deflecting apparatus 108 that directs green tops 18 and debris from the cutting process downward to inhibit such offal from passing rearward to the inspection assembly 110. A bearing block guard 112 protects upper bearing block assembly 100 from onions 20 and harvesting debris. Distribution apparatus 114 directs the cut onions 20 to the distribution chute 115 where the onions will pass to the inspection assembly 110. To control the length of the tops 18 remaining on onions 20, the cutting assembly 92 of the preferred embodiment of the present invention 10 includes an adjustable topping length limiting device 116, as shown in FIG. 9. Topping length limiting device 116 is positioned directly above the point at which the severing of the onion tops 18 occurs and is located along the entire length of the roller bar cutters 96. To allow for varying lengths of onion tops 18 left on the onion 20, based on preference, the topping length limiting device 116 should be vertically adjustable. After the onions 12 are deposited on the roller bar cutting assembly 92 from the inclined elevator assembly 78, they Will be moved to the center of the roller bar cutters 96 and rearward toward the inspection assembly 110. The topping length limiting device 116 will prevent the roller bar cutters 96 from cutting off too much of the onion tops 18 and prevent the cutters 96 from cutting into and damaging the onions 20.

Inspection assembly 110 comprises a discharge and inspection conveyor 118 consisting of a belted bar chain 120 supported by a plurality of rollers 122 and interconnecting a first inspection roller 124 and a second inspection sprocket 126. Inspection conveyor 118 is driven by a hydraulic motor (not shown) connected to hydraulic pump 50 for moving the onions rearward in the harvester 10 to the sacking assembly 128. The discharge and inspection conveyor 118 provides a location for onions 20, with their tops removed, to be inspected and any refuge remaining from the severing operation to be removed prior to the sacking operation. The belted bar chain 120 should have a pitch that allows undersize onions and offal to fall to the soil surface below. Alternatively, inspection conveyor 118 can be a conveyor belt-type surface that is relatively flat and solid. Sacking assembly 128 comprises a plurality of sacking stations that allows the onions to be deposited into field curing sacks 130 (such as burlap sacks), hanging on racks 132, by operators standing on the rear operating platform 134. The sack storage platform 136 is located conveniently in close proximity to the operators tending the sacking assembly 128 to facilitate the change out full sacks with empty sacks. Rear operating platform 134 is vertically adjustable by hydraulic ram 138 to provide for increased ground clearance when harvester 10 is being moved on highways and roads between fields.

To facilitate improved quality of onions 20 harvested by the harvester 10 of the present invention, the harvester 10 includes a number of platforms along the sides 28 and 30 of harvester 10 (as best shown in FIG. 2). The primary inspection platform 140 provides for the initial inspection of the onions 12 and removal of unmarketable onions, weeds and other field debris prior to the roller cutter bar assembly 92. The side discharge and inspection platform 142 allows inspection, further processing of the onions 10 and final removal of any remaining debris prior to the sacking operation. The rear operating platform 136 allows for the deposing of the onions 10 into the sacks 130.

Figure 12:
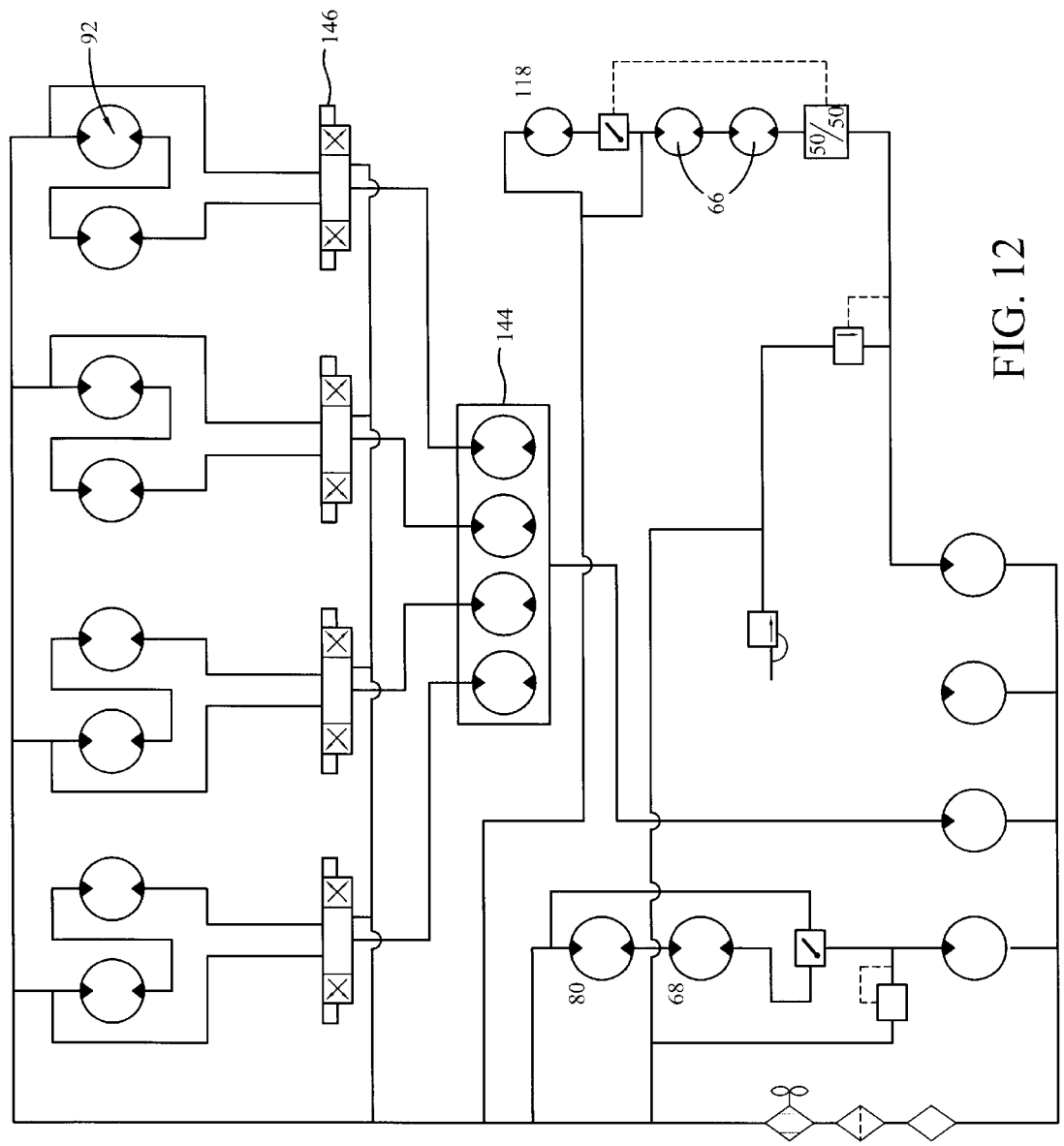
FIG. 12 is a schematic of the hydraulic flow diagram for use with the harvester of the present invention.

As set forth above,-hydraulic pump 50 is in fluid communication with the lifting bar 54, flapper wheel 66, lifting elevator conveyor 68, inclined elevator conveyor 80, roller cutter bar mechanisms 92, discharge and inspection conveyor 118, lifting elevator conveyor hydraulic ram 62, rear platform hydraulic ram 138 and various other harvester components. Other than the hydraulic rams 62 and 138, the above hydraulically driven devices have flow regulators to adjust the speed according to operating conditions. The roller cutter bar mechanisms 92 are controlled, however, as a group of four pairs and not individually. As shown in FIG. 12, the flow of hydraulic fluid from the hydraulic pump 50 is distributed to each of the four pairs of roller bar cutting assemblies 92 (in the preferred embodiment) by a flow divider mechanism 144 that ensures equal hydraulic pressure is distributed to each of the four pairs of roller bar cutters 96. Without the flow divider 144 in the harvester 10 of the present invention, the hydraulic fluid would go to the pair of motors. 97 having the least amount of resistence. This would cause unequal speed between the roller bar cutting assemblies 92 as one pair of roller bar cutters 96 slows down and the others speed up. The flow divider 144 ensures that all pairs of roller bar cutters 96 would rotate at the same speed (RPM). A three position control valve 146, shown in FIG. 12, is located between the flow divider 144 and the hydraulic motors 97 for each of the four pairs of roller bar cutters 96 to individually control (i.e., stop, reverse, etc.) each set of cutters 96.

In use, the harvester 10 of the present invention is towed or driven, depending on whether it is self-propelled or not, to the field 14 where onions 12 need to be harvested. Due to the configuration and function of the present harvester 10, the onions 12 can be harvested while the tops 18 are still green, avoiding the need to wait until they are partially or completely dried out, as is necessary for prior art harvesters to work satisfactorily. The onion plants 12 are extracted from field 14 by lifting bar 54 and coaxed into the lifting conveyor 68 by the rotating flapper wheel 66. The lifting conveyor 68 transports the onion plants 12 to the inclined elevator assembly 78. The belt chain configuration of the inclined elevator 80 allows small onions, rocks, dirt and other debris to fall to the ground below harvester 10 before the onion plants 12 are delivered to the roller bar cutting assembly 92. Upon discharge from the inclined elevator 80, the onions 12 tumble onto or are directed by channeling devices 106 to the upper surface fo the roller bar cutting mechanism 92. The hydraulic motors 97 rotate the roller bar cutters 96 in the roller bar cutting assembly 92 in sets, with one-half of each set rotating in a counter-rotating direction. The combined actions of gravity and the opposing rotation of the roller bar cutters 96 induce the roots 16 and tops 18 to be drawn into the roller bar cutters 96, where they are severed from the onion bulb 20 and deposited on the ground. The topping length limiting device 116, parallel and slightly above the roller bar cutters 96, set the amount of top 18 to remain on the bulb 20. Workers standing on the primary inspection platform 140 can cull out unmarketable onions 12 and debris. From the roller bar cutting assembly 92, the onion bulbs 20 are transported rearward toward the distribution chutes 115 by being diverted by the bearing block guard 112 and distribution apparatus 114. The chutes 115 deliver the prepared onion bulbs 20 to the inspection conveyor 118 where workers standing on the side discharge platform 142 can make the final inspection of the onions 20 before they are placed into sacks 130 on the rear operating platform 134. The result of harvesting onions 12 with the harvester 10 of the present invention is to obtain a less damaged final product (i.e., onion 20) in a more manpower and time efficient manner.

As an alternative to sacking the onions 20 at the back end 40 of harvester 10, harvester 10 can include a chute device that is suitable for returning the onions 20 to the ground. As another alternative, the harvester 10 can be provided with a continuous elevator conveyor system suitable for transferring the onions 20 to an adjacent vehicle for removal from the field 14.

From the foregoing description it will be apparent that there has been provided an apparatus for the harvesting and topping of bulb crops wherein the length of residual top is controlled by reference to the shoulder of each bulb, wherein the length of residual top is the same for each bulb and wherein tops may be trimmed to a desirably short length without damaging the bulbs. While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. Accordingly, the foregoing description should be taken as illustrative and not in a limiting sense.

What is claimed is:

1. A harvester for harvesting a plurality of bulb crops from a field, comprising:
   a harvester frame having a top portion and a pair of opposing sides, said harvester frame comprised of a plurality of frame members;
   crop extracting means for extracting said crops from the field and delivering said crops to one or more conveyor assemblies connected to said frame;
   a roller bar cutting assembly configured to receive said crops from said conveyor assemblies, said roller bar cutting assembly comprising a plurality of roller bar cutters, said roller bar cutting assembly operatively connected to a supply of power for rotating said roller bar cutters;
   an inspection assembly configured to receive said crops from said roller bar cutting assembly; and
   a sacking assembly configured to receive said crops from said inspection assembly.

2. The harvester according to claim 1, wherein said conveyor assemblies are configured to allow unwanted crops and debris to fall through said conveyor assemblies onto the ground.

3. The harvester according to claim 2, wherein at least one of said conveyor assemblies has openings approximately 1½" to 1⅞" wide.

4. The harvester according to claim 1, wherein said crop extracting means is configured to raise or lower relative to said harvester frame.

5. The harvester according to claim 1, wherein said crop extracting means comprises a lifting bar and a flapper wheel.

6. The harvester according to claim 1, wherein said roller bar cutters are configured in one or more sets, each of said sets having at least a pair of roller bar cutters rotating in opposite directions.

7. The harvester according to claim 6, wherein said pair of roller bar cutters rotate in a generally elliptical path.

8. The harvester according to claim 6, wherein said roller bar cutting assembly further comprises a hydraulic gear splitter to equalize the volume and pressure to each of said one or more sets of roller bar cutters.

9. The harvester according to claim 1, wherein said roller bar cutting assembly comprises an upper bearing block assembly and an opposing lower block assembly at the ends of said roller bar cutters.

10. The harvester according to claim 1, wherein said roller bar cutters are shaped and configured to provide an angled leading edge to cut said crop.

11. The harvester according to claim 1, wherein said roller bar cutting assembly comprises one or more channeling devices separating said plurality of roller bar cutters.

12. The harvester according to claim 1, wherein said roller bar cutting assembly comprises a deflecting apparatus to deflect unwanted portions of said crops away from said harvester.

13. The harvester according to claim 1, wherein said roller bar cutting assembly comprises a bearing block guard and distribution apparatus to deflect said crop to said inspection assembly.

14. The harvester according to claim 1, wherein said roller bar cutting assembly comprises a topping limiting device.

15. The harvester according to claim 1 further comprising one or more platforms on at least one of said pair of opposing sides of said harvester.

16. The harvester according to claim 1 further comprising a flow divider disposed between said supply of power and said roller bar cutting assembly.

17. The harvester according to claim 16 further comprising a control valve disposed between said flow divider and said roller bar cutting assembly.

18. A harvester for harvesting a plurality of bulb crops from a field, comprising:
   a harvester frame having a top portion and a pair of opposing sides, said harvester frame comprised of a plurality of frame members;
   crop extracting means for extracting said crops from the field and delivering said crops to one or more conveyor assemblies connected to said frame, said crop extracting means configured to raise or lower relative to said harvester frame;
   a roller bar cutting assembly configured to receive said crops from said conveyor assemblies, said roller bar cutting assembly comprising a plurality of roller bar cutters, said roller bar cutting assembly operatively connected to a supply of power for rotating said roller bar cutters, said roller bar cutters configured in one or more sets, each of said sets having at least a pair of roller bar cutters rotating in opposite directions;
   an inspection assembly configured to receive said crops from said roller bar cutting assembly; and
   a sacking assembly configured to receive said crops from said inspection assembly.

19. The harvester according to claim 18, wherein said pair of roller bar cutters rotate in a generally elliptical path.

20. The harvester according to claim 18, wherein said roller bar cutting assembly further comprises a hydraulic gear splitter to equalize the volume and pressure to each of said one or more sets of roller bar cutters.

21. The harvester according to claim 18, wherein said roller bar cutting assembly comprises a topping limiting device.

22. The harvester according to claim 18 further comprising one or more platforms on at least one of said pair of opposing sides of said harvester.

23. The harvester according to claim 18 further comprising a flow divider disposed between said supply of power and said roller bar cutting assembly.

24. The harvester according to claim 23 further comprising a control valve disposed between said flow divider and said roller bar cutting assembly.

25. A harvester for harvesting a plurality of bulb crops from a field, comprising:
   a harvester frame having a top portion and a pair of opposing sides, said harvester frame comprised of a plurality of frame members;
   crop extracting means for extracting said crops from the field and delivering said crops to one or more conveyor assemblies connected to said frame, said crop extracting means configured to raise or lower relative to said harvester frame;

a roller bar cutting assembly configured to receive said crops from said conveyor assemblies, said roller bar cutting assembly comprising a plurality of roller bar cutters, said roller bar cutting assembly operatively connected to a supply of power for rotating said roller bar cutters, said roller bar cutters configured in one or more sets, each of said sets having at least a pair of roller bar cutters rotating in opposite directions in a generally elliptical path;

a flow divider disposed between said supply of power and said roller bar cutting assembly an inspection assembly configured to receive said crops from said roller bar cutting assembly;

a sacking assembly configured to receive said crops from said inspection assembly; and one or more platforms on said harvester.

26. The harvester according to claim 25, wherein said pair of roller bar cutters rotate in a generally elliptical path.

27. The harvester according to claim 25 wherein said roller bar cutting assembly comprises a topping limiting device.

28. The harvester according to claim 25 further comprising a control valve disposed between said flow divider and said roller bar cutting assembly.

* * * * *